United States Patent [19]

Iio et al.

[11] 4,333,431
[45] Jun. 8, 1982

[54] WATER-COOLED TWO STROKE ENGINE HAVING EXHAUST PORT TIMING CONTROL VALVE MEANS

[75] Inventors: Toshimitsu Iio, Hamamatsu; Yuusaku Yamaoka, Iwata, both of Japan

[73] Assignee: Yamaha Hatsudoki Kabushiki Kaisha, Japan

[21] Appl. No.: 192,860

[22] Filed: Oct. 1, 1980

[30] Foreign Application Priority Data

Oct. 17, 1979 [JP] Japan .............................. 54-133863

[51] Int. Cl.³ .......................................... F02B 75/02
[52] U.S. Cl. ............................ 123/323; 123/65 PE; 123/378
[58] Field of Search ............ 123/323, 378, 385, 65 PE

[56] References Cited
U.S. PATENT DOCUMENTS

| | | | |
|---|---|---|---|
| 906,884 | 12/1908 | Huff | 123/378 |
| 1,358,812 | 11/1920 | Anderson | 123/378 |
| 2,369,397 | 2/1945 | Kostenick | 123/378 |
| 3,643,639 | 2/1972 | Bier | 123/378 |
| 3,751,921 | 8/1973 | Blomberg | 123/323 |
| 4,121,552 | 10/1978 | Mithuo et al. | 123/323 |
| 4,202,297 | 5/1980 | Oku et al. | 123/65 PE |
| 4,285,311 | 8/1981 | Iio | 123/323 |

*Primary Examiner*—Wendell E. Burns
*Attorney, Agent, or Firm*—Kerkam, Stowell, Kondracki & Clarke

[57] ABSTRACT

A water-cooled two stroke engine including a cylinder formed with an exhaust port which is adapted to be cyclically closed by a piston reciprocating in the cylinder. The exhaust port is provided at the upper portion with a port timing control valve which is operated to control the port timing in accordance with the engine speed by a piston-cylinder type actuator. The actuator is adaped to be operated by the engine cooling water pressure and has an operating pressure chamber at one side of the piston and a compensating pressure chamber at the other side. The cooling water supply passage has a flow restriction and the pressure upstream of the restriction is introduced into the operating pressure chamber and that downstream of the restriction into the compensating pressure chamber.

5 Claims, 4 Drawing Figures

WATER-COOLED TWO STROKE ENGINE HAVING EXHAUST PORT TIMING CONTROL VALVE MEANS

The present invention relates to two stroke internal combustion engines and more particularly to exhaust means for two stroke engines.

In general, two stroke engines have an exhaust port formed in the wall of a cylinder so that it is controlled by a piston reciprocating in the cylinder. In this type of engines, it has been recognized that the engine performance is highly dependent on the engine speed since it is very difficult to accomplish an optimum scavenging effect throughout the engine operating range. For example, under a high engine speed wherein the intake mixture has a relatively high flow speed so that the flame propagation rate is relatively high, it is recommendable to have the exhaust port timing advanced so that the scavenging effect is promoted. However, such an advanced exhaust port timing may cause a blow-off of unburnt mixture under a low speed engine operation so that there will be an adverse effect on the fuel economy and combustion may become unstable.

In order to overcome the above problems, there has been proposed to provide means for covering the upper portion of the exhaust port under a low speed engine operation so that the exhaust port opening timing is retarded. For example, in Japanese patent publication No. 47-36047, there is disclosed a two stroke engine having an arcuate member which is adapted to be moved to a position covering the upper portion of the exhaust port. The U.S. Pat. No. 4,121,552 teaches to provide the upper portion of the exhaust port with a rotary valve which is movable between an open and closed positions to change the exhaust port timing. This arrangement is considered as advantageous over the arrangement in the Japanese patent publication in that there is no part which may project into the exhaust port in the open position of the rotary valve. In the U.S. Pat. No. 4,202,297, there is disclosed a two stroke engine which has an improved rotary valve structure for changing the exhaust port timing.

The arcuate member in accordance with the Japanese patent publication and the rotary valves in the U.S. patents may be controlled in response to the engine speed or to the engine load which may be sensed as the throttle valve position or as the intake pressure. In an water-cooled engine, the cooling water supply pressure may be utilized for controlling the aforementioned members because the water supply pressure changes in accordance with the engine speed. The U.S. Pat. No. 4,202,297 teaches to control the rotary valve by an actuator which is driven by the engine cooling water. However, there is no specific disclosure for such actuator.

Japanese patent application No. 53-34501 which has been filed on Mar. 25, 1978 and disclosed for public inspection on Oct. 2, 1979 under the disclosure No. 54-126,812 discloses an actuator structure which is adapted to drive the exhaust port rotary valve in accordance with the engine cooling water pressure. According to the teachings of the Japanese patent application, the valve actuator comprises a single acting piston-cylinder device which is provided at one end of the cylinder with a pressure chamber wherein the engine cooling water is introduced. The other end of the cylinder is opened to the atmosphere so that the piston is moved under the pressure of the engine cooling water to therby actuate the rotary valve. A return spring is provided in the other end of the cylinder so that the piston is moved to a position wherein the rotary valve is in the closed position under a low engine speed so as to have the exhaust port timing retarded.

However, the arrangement as proposed by the Japanese patent application is not satisfactory because the engine cooling water pressure generally changes in accordance not only with the engine speed but also with the water temperature in order to have an improved cooling effect so that the exhaust port rotary valve may be actuated in response to a change in the temperature of the engine cooling water. It will thus be understood that the structure as proposed by the Japanese patent application cannot exactly control the exhaust port timing in accordance with the engine speed.

It is therefore an object of the present invention to provide an actuating mechanism for an exhaust port timing control valve which can control the exhaust port timing in accordance with the engine speed.

Another object of the present invention is to provide an exhaust port timing control valve mechanism having an actuator which is adapted to be operated by the engine cooling water pressure but is substantially free from the influence of the water temperature.

According to the present invention, the above and other objects can be accomplished by a water-cooled two stroke engine comprising cylinder means having cylinder wall means formed with exhaust port means, piston means provided in said cylinder means for reciprocating movement so that the exhaust port means is cyclically closed by the piston means, said exhaust port means being provided at an upper portion thereof with exhaust port timing control valve means, cooling water jacket means formed in said cylinder means, cooling water passage means having restriction means and leading to said jacket means for providing a supply of cooling water to said jacket means, actuator means for moving the valve means under a low engine speed to a position wherein it covers the upper portion of the exhaust port means so that exhaust port opening timing is retarded, said actuator means comprising pressure responsive movable means, operating pressure chamber means defined at one side of the movable means for applying said movable means with a pressure in said cooling water passage means upstream of the restriction means, and compensating pressure chamber means defined at the opposite side of the movable means for applying the movable means with a pressure in said cooling water passage means downstream of the restriction means, said movable means being connected with said valve means so that the valve means is moved to a position wherein it uncovers the upper portion of the exhaust port means when the movable means is moved under a pressure in the operating pressure chamber means.

Typically, the actuator means may be embodied in the form of a piston-cylinder mechanism, however, any other types of pressure responsive mechanisms may be used. According to the features of the present invention, any effect of the temperature on the water pressure in the operating pressure chamber means is counterbalanced by a corresponding effect on the water pressure in the compensating pressure chamber. It is therefore possible to control the valve means exactly in accordance with the engine speed.

The above and other objects and features of the present invention will become apparent from the following descriptions of preferred embodiments taking reference to the accompanying drawings, in which.

Figure 1:
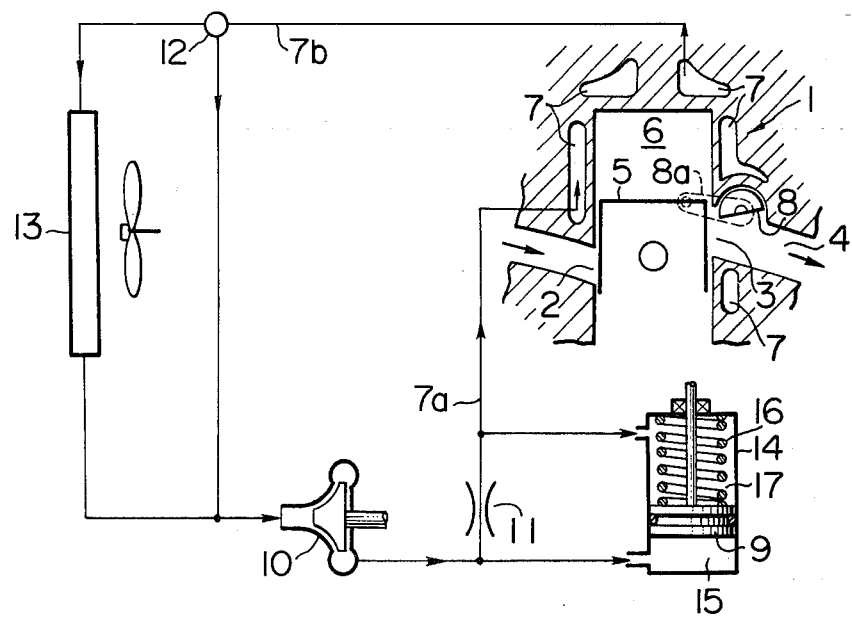
FIG. 1 is a diagrammatical sectional view of a water-cooled two stroke engine showing the principle of the exhaust port timing control valve actuator in accordance with the present invention.

Referring now to the drawings, particularly to FIG. 1, there is shown a two stroke engine comprising a cylinder 1 formed with an intake port 2 and an exhaust port 3 which leads to an exhaust passage 4. In the cylinder 1, there is disposed a piston 5 which is adapted to reciprocate in the cylinder 1 and defines a combustion chamber 6. The cylinder 1 is formed with cooling water jackets 7 for passing engine cooling water. The exhaust port 3 is provided at the upper portion thereof with a rotary type exhaust port timing control valve 8 which may be of the type disclosed in the U.S. Pat. No. 4,202,297.

The engine includes a cooling water passage 7a leading from a water pump 10 to the inlet of the water jackets 7. A water return passage 7b is provided between the outlet of the water jackets 7 and the water pump 10, and includes a thermostatically operated valve 12 and a heat radiator 13. In the water passage 7a, there is provided a flow restriction 11.

The valve 8 in the exhaust port 8 is provided with an actuating lever 8a which is connected with an actuator comprised of a cylinder 14 and a piston 9 disposed in the cylinder 14. The piston 9 divides the interior of the cylinder 14 into an operating pressure chamber 15 and a compensating pressure chamber 17. In the compensating pressure chamber 17, there is a spring 16 which forces the piston 9 toward the chamber 15. The piston 9 is connected with the actuating lever 8a so that, when the piston 9 is moved under the influence of the spring 16, the valve 8 is rotated to a position wherein it covers the upper portion of the exhaust port 3 as shown in FIG. 1. The operating pressure chamber 15 is connected with the passage 7a upstream of the restriction 11 so that the outlet pressure of the pump 10 is introduced into the chamber 15. The compensating pressure chamber 17 is connected with the passage 7a downstream of the restriction 11. Thus, the piston 9 is subjected to a pressure difference corresponding to a pressure drop across the restriction 11 which is proportional to the engine speed. The piston 9 is moved under the pressure difference to retract the valve 8 from the exhaust port 3.

Figure 2:
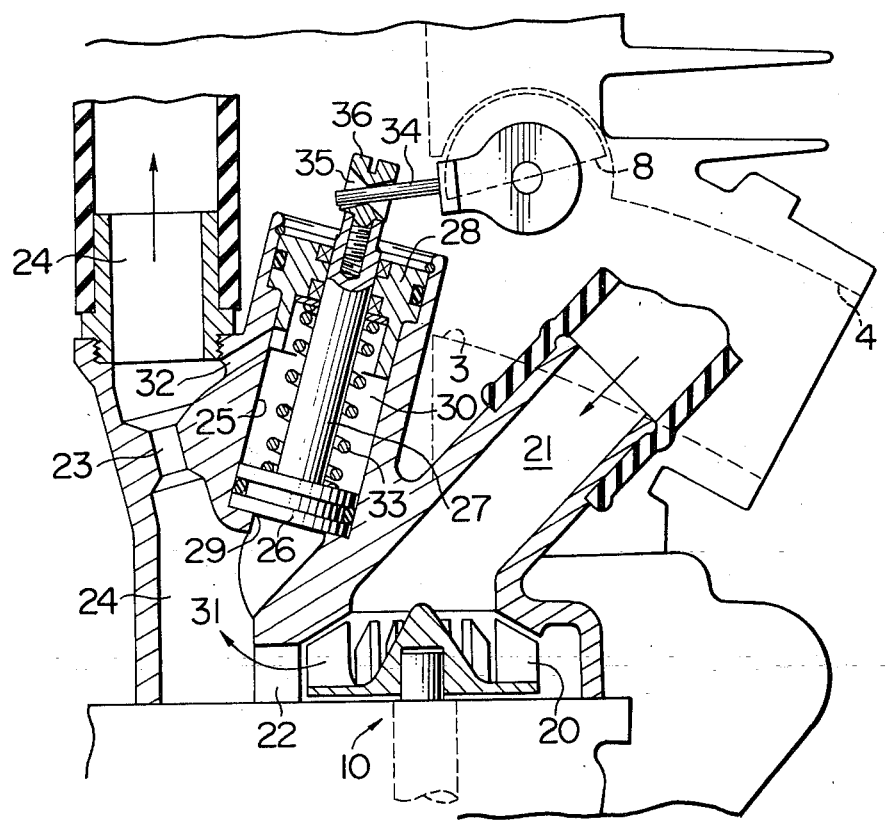
FIG. 2 is a fragmentary sectional view showing the valve actuator in accordance with one embodiment of the present invention.

Referring now to FIG. 2, there is shown a specific embodiment of the present invention wherein the water pump 10 comprises an impeller 20 which draws engine cooling water from an inlet passage 21 and discharges to an outlet passage 22. The outlet passage 22 leads to a water passage 24 which has a flow restriction 23 and leads to water jackets formed in the cylinder.

The exhaust port timing control valve 8 provided at the upper portion of the exhaust port 3 is attached with an actuating lever 34. In the water pump housing, there is formed a cylinder bore 25 which is connected at one end through a passage 31 with the water passage 24 upstream of the restriction 23 and closed at the other end by a cap 28. In the cylinder bore 25, there is disposed a piston 26 which divides the cylinder bore 25 into an operating pressure chamber 29 communicating with the passage 31 and a compensating pressure chamber 30. The chamber 30 is connected through a passage 32 with the passage 24 downstream of the restriction 23.

The piston 26 has a piston rod 27 which extends through the chamber 30 and the cap 28 and is attached with a fitting 36. The fitting 36 is formed with an aperture 35 which is adapted to be engaged with the actuating lever 34 on the valve 8. In the compensating pressure chamber 30, there is a spring 33 which forces the piston toward the passage 31. The operation of the arrangement is substantially the same as that described with reference to FIG. 1.

Figure 3:
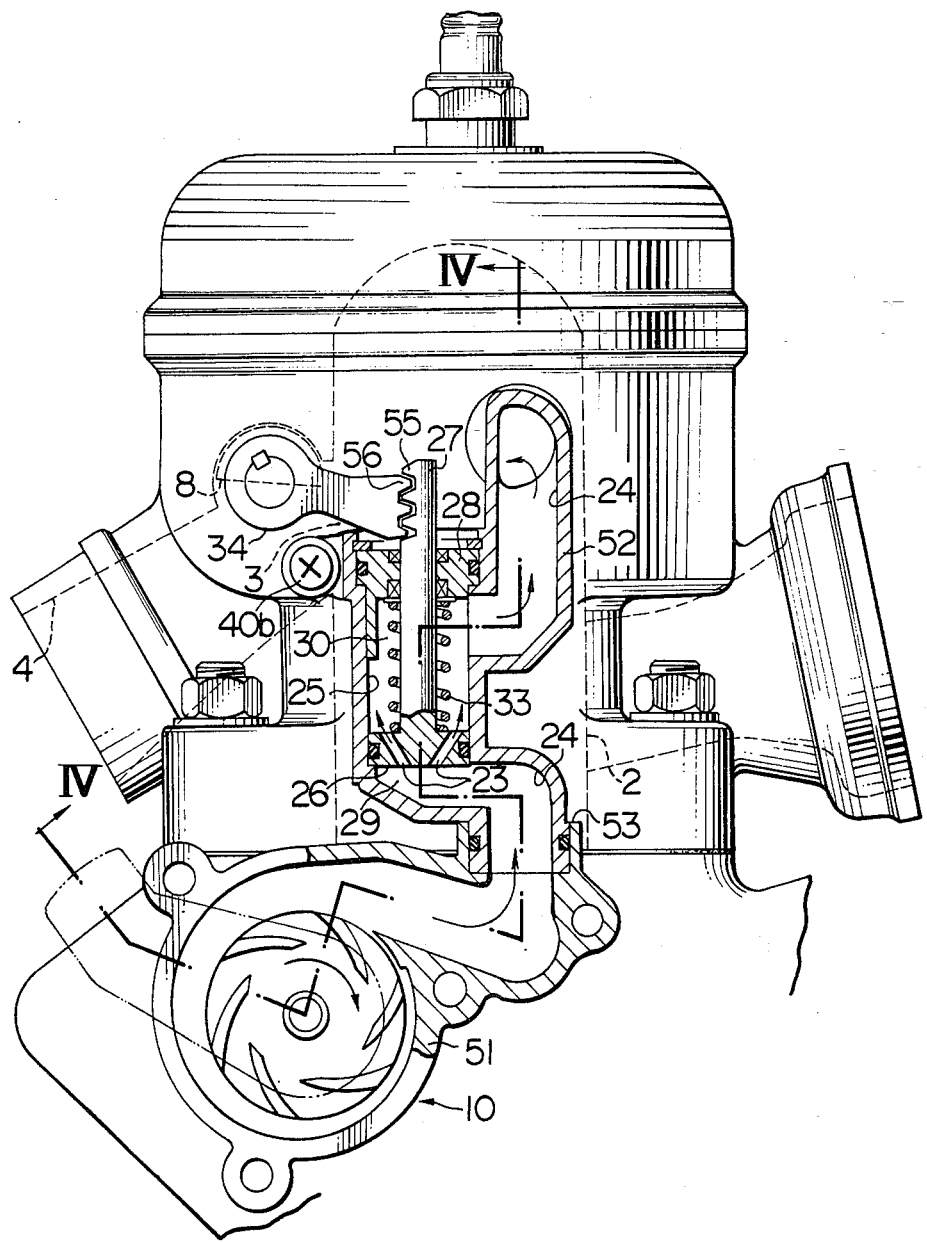
FIG. 3 is a fragmentary sectional view showing another embodiment of the present invention; and, FIG. 4 is a sectional view taken substantially along the line IV—IV in FIG. 3.
Figure 4:
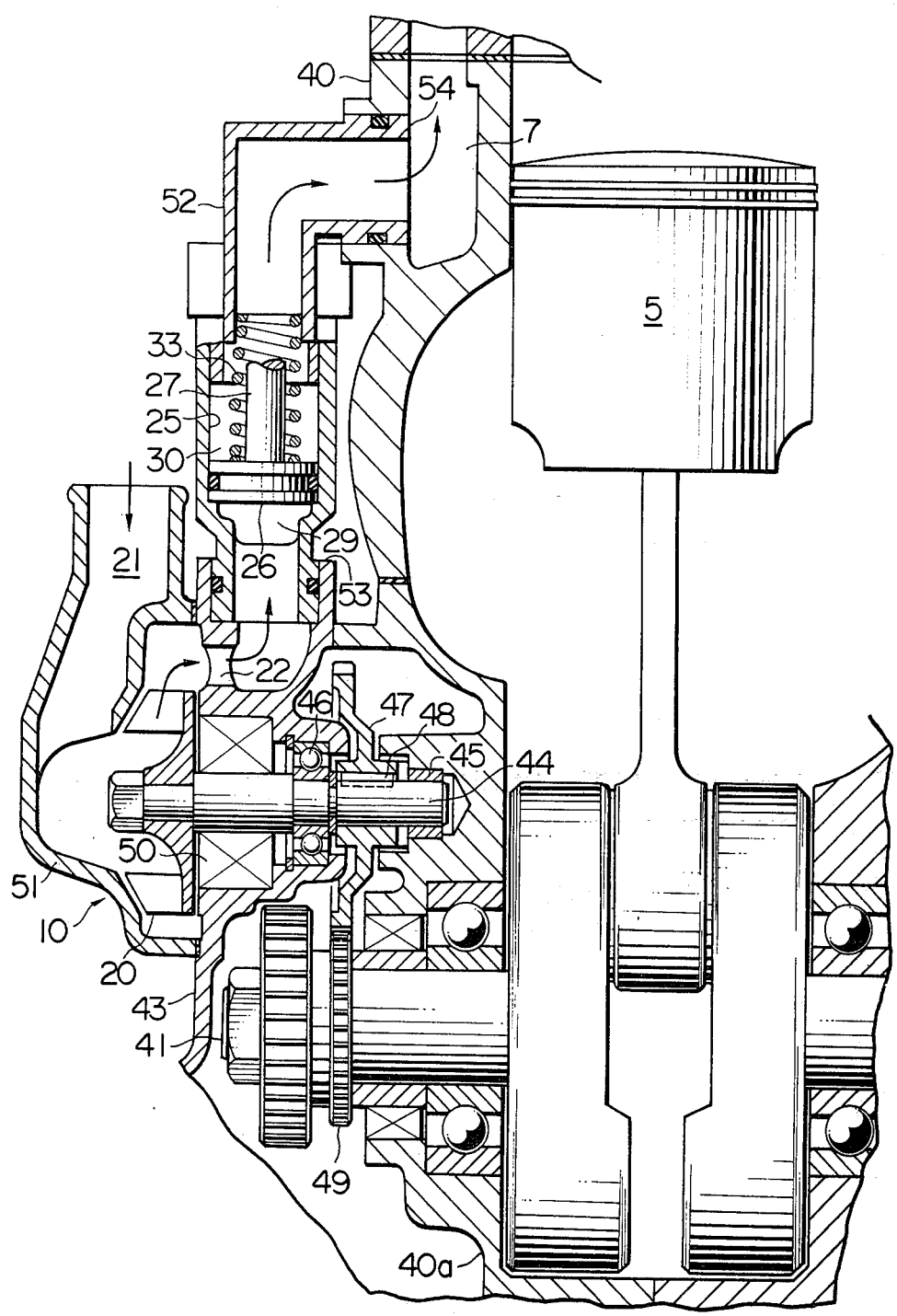

Referring to FIGS. 3 and 4, there is shown a further embodiment wherein corresponding parts are designated by the same reference numerals as in FIG. 2. In the embodiment shown in FIGS. 3 and 4, the flow restriction in the passage 24 is in the form of orifices 23 formed in the piston 26. The water pump 10 includes a pump cover 51 which covers the impeller 20 and has an water inlet 21. The pump 10 has an outlet 22 leading to the passage 24 which in turn leads to and from the cylinder bore 25.

The cylinder bore 25 and the passage 24 are formed in an interconnecting member 52 which is attached on one hand to a crankcase side cover 43 at an annular wall 53 formed therein and on the other hand to the engine cylinder block 40 at the attachment hole 54 formed therein. The piston 26 has a piston rod 27 which extends outwardly through the cap 28 and is formed at the outer end portion with a rack 55. The actuating lever 34 attached to the exhaust port timing control valve 8 has an outer end formed with gear teeth 56 which are adapted to be engaged with the rack 55.

The impeller 20 of the water pump 10 has a shaft 44 which is journalled by bearings 45 and 46 and attached with a gear 47. The engine has a crankshaft 41 which is provided with a gear 49 for driving engagement with the gear 47 on the impeller shaft 44. Thus, the impeller 20 is driven by the engine crankshaft 41 through the gears 47 and 49.

In this embodiment, the piston 26 divides the cylinder bore 25 into an operating pressure chamber 29 and a compensating pressure chamber 30 and a pressure drop is produced across the piston 26 by the orifices 23. In the compensating pressure chamber 30, there is provided a spring 33 which forces the piston 26 toward the chamber 29.

The invention has thus been shown and described with reference to specific embodiments, however, it should be noted that the invention is in no way limited to the details of the illustrated structures but changes and modifications may be made without departing from the scope of the appended claims.

We claim:

1. A water-cooled two stroke engine comprising cylinder means having cylinder wall means formed with exhaust port means, piston means provided in said cylinder means for reciprocating movement so that the exhaust port means is cyclically closed by the piston means, said exhaust port means being provided at an upper portion thereof with exhaust port timing control valve means, cooling water jacket means formed in said cylinder means, cooling water passage means having restriction means and leading to said jacket means for providing a supply of cooling water to said jacket means, actuator means for moving the valve means under a low engine speed to a position wherein it covers the upper portion of the exhaust port means so that exhaust port opening timing is retarded, said actuator means comprising pressure responsive movable means, operating pressure chamber means defined at one side of the movable means for applying said movable means with a pressure in said cooling water passage means upstream of the restriction means, and compensating pressure chamber means defined at the opposite side of the movable means for applying the movable means with a pressure in said cooling water passage means downstream of the restriction means, said movable means being connected with said valve means so that the valve means is moved to a position wherein it uncovers the upper portion of the exhaust port means when the movable means is moved under a pressure in the operating pressure chamber means.

2. An engine in accordance with claim 1 in which said actuator means is provided in parallel with the restriction means in the cooling water passage means, said operating pressure chamber means being connected to the cooling water passage means upstream of the restriction means, said compensation pressure chamber means being connected to the cooling water passage means downstream of the restriction means.

3. An engine in accordance with claim 2 in which said actuator means is a piston-cylinder device.

4. An engine in accordance with claim 1 in which said actuator means is provided in said cooling water passage means, said restriction means being provided through said movable means to produce a pressure drop across the movable means.

5. An engine in accordance with claim 4 in which said actuator means includes cylinder bore means formed in said cooling water passage means, said movable means being piston means disposed in said cylinder bore means and formed with orifice means constituting said restriction means.

* * * * *